(12) United States Patent
Aiso et al.

(10) Patent No.: US 9,156,117 B2
(45) Date of Patent: Oct. 13, 2015

(54) METHOD OF CUTTING STEEL FOR MACHINE STRUCTURAL USE

(75) Inventors: Toshiharu Aiso, Tokyo (JP); Suguru Yoshida, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 13/881,774

(22) PCT Filed: Nov. 1, 2011

(86) PCT No.: PCT/JP2011/075198
§ 371 (c)(1),
(2), (4) Date: Apr. 26, 2013

(87) PCT Pub. No.: WO2012/060383
PCT Pub. Date: May 10, 2012

(65) Prior Publication Data
US 2013/0213199 A1    Aug. 22, 2013

(30) Foreign Application Priority Data

Nov. 2, 2010 (JP) .................................. 2010-246072

(51) Int. Cl.
*B26D 7/08* (2006.01)
*B23Q 11/10* (2006.01)
(Continued)

(52) U.S. Cl.
CPC ........ *B23Q 11/1038* (2013.01); *B23Q 11/1007* (2013.01); *B23Q 11/1061* (2013.01);
(Continued)

(58) Field of Classification Search
CPC ...... B23D 59/02; B23D 59/025; B23D 59/04; B23Q 11/1038; B23Q 11/1007; B23Q 11/1061; C10N 2240/401; Y10T 83/0443; Y10T 83/263

USPC ...................................................... 83/22, 169
See application file for complete search history.

(56) References Cited

U.S. PATENT DOCUMENTS

2003/0130407 A1* 7/2003 Chen ............................ 524/505
2006/0122072 A1* 6/2006 Erdemir et al. ............... 508/155
(Continued)

FOREIGN PATENT DOCUMENTS

CN   101528412   9/2009
CN   101542004   9/2009
(Continued)

OTHER PUBLICATIONS

Office Action of Feb. 28, 2014 issued in corresponding Chinese Application No. 201180052090.3 [with English Translation].
International Search Report dated Dec. 6, 2011, issued in corresponding PCT Application No. PCT/JP2011/075198.
Notice of Allowance of Aug. 4, 2014 issued in corresponding Chinese Application No. 201180052090.3 [with English Translation].

*Primary Examiner* — Kenneth E. Peterson
*Assistant Examiner* — Samuel A Davies
(74) *Attorney, Agent, or Firm* — Kenyon & Kenyon LLP (57) ABSTRACT

In the method of cutting steel for machine structural use, steel for machine structural use, in which chemical components contain, by mass %, 0.01% to 1.2% of C, 0.005% to 3.0% of Si, 0.05% to 3.0% of Mn, 0.001% to 0.2% of P, 0.001% to 0.35% of S, 0.002% to 0.035% of N and 0.05% to 1.0% of Al, in a case in which [Al%] and [N%] represent the mass % of Al and N in the steel respectively, [Al%]−(27/14)×[N%]≥0.05% is satisfied, is the other elements are included as necessary, and a balance consisting of Fe and inevitable impurities, is used, and a cutting process is carried out on the steel for machine structural use using water-insoluble cutting oil in which the amount of dissolved oxygen is 4 volume % to 16 volume %.

5 Claims, 1 Drawing Sheet (51) Int. Cl.
*C22C 38/00* (2006.01)
*C22C 38/02* (2006.01)
*C22C 38/04* (2006.01)
*C22C 38/06* (2006.01)
*C22C 38/12* (2006.01)
*C22C 38/14* (2006.01)
*C22C 38/60* (2006.01)
*C22C 38/08* (2006.01)
*C22C 38/18* (2006.01)

(52) U.S. Cl.
CPC ............. *C22C38/001* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/18* (2013.01); *C22C 38/60* (2013.01); *Y10T 83/0443* (2015.04); *Y10T 83/263* (2015.04)

(56) References Cited

U.S. PATENT DOCUMENTS

2007/0245799 A1*  10/2007  Asakawa ........................ 72/467
2010/0011923 A1*  1/2010  Suda et al. ........................ 83/22

FOREIGN PATENT DOCUMENTS

| | | |
|---|---|---|
| EP | 0637636 | 11/2000 |
| JP | 2002-066801 | 3/2002 |
| JP | 2002-167594 | 6/2002 |
| JP | 2006-225491 | 8/2006 |
| JP | 2008-013788 | 1/2008 |
| JP | 2010-188480 | 9/2010 |
| RU | 2177866 | 1/2002 |
| WO | 2010/082454 | 7/2010 |

* cited by examiner

METHOD OF CUTTING STEEL FOR MACHINE STRUCTURAL USE

TECHNICAL FIELD

The present invention relates to a method of cutting steel for machine structural use.

This application is a national stage application of International Application No. PCT/JP2011/075198, filed Nov. 1, 2011, which claims priority to Japanese Patent Application No. 2010-246072, filed Nov. 2, 2010, the content of which is incorporated herein by reference.

BACKGROUND ART

In recent years, from the viewpoint of global environmental issues, it has become imperative to consider environmental issue, such as energy saving, resource saving and reduction of environmentally hazardous substances, when manufacturing industrial products. Most of the components for machine structural use, such as gears, shafts and nuts, which are manufactured using steel for machine structural use, are manufactured by cutting steel for machine structural use. Therefore, in the field of a cutting process of steel for machine structural use, it is necessary to study cutting techniques and techniques considering environmental issue in terms of steel for machine structural use which is the subject to be cut.

In cutting steel for machine structural use, in order to improve the cutting process efficiency more than in a dry process or a semi-dry process, a process in which cutting oil is used is widely carried out. The cutting oil is classified into water-insoluble cutting oil, which is used as an undiluted solution, and water-soluble cutting oil, which is used after being diluted using water. While both types of the cutting oil are widely used in the cutting of steel for machine structural use, the water-insoluble cutting oil accounts for the majority of cutting oils used in a case in which a process in which finish accuracy is required, such as gun drilling, gear cutting, broaching or tapping, or a process which is carried out with a large tool load. Therefore, it is necessary to increase the efficiency of a process in which water-insoluble cutting oil is used.

A chlorine-based extreme-pressure agent, which is cheap and has excellent lubrication property, is added to water-insoluble cutting oil; however, due to recent environmental issues, the costs for treating cutting oil including the chlorine-based extreme-pressure agent have increased, and therefore, currently, a sulfur-based extreme-pressure agent is mainly used as an alternative of the chlorine-based extreme-pressure agent. However, since the use of a sulfur-based extreme-pressure agent cannot provide sufficient lubrication property, there is a demand for cutting techniques which can provide excellent lubrication property and increase cutting efficiency.

Meanwhile, regarding the steel for machine structural use, in order to increase the efficiency of a cutting process, it is necessary to increase the machinability of steel, that is, to make steel more easily cut. In the past, S or Pb was added in order to improve the machinability of steel for machine structural use. However, when the amount of S added increases, there is a problem in that the mechanical properties deteriorate. On the other hand, since Pb degrades the mechanical properties only slightly so as to improve the machinability, Pb has been usefully used to improve the machinability of steel for machine structural use. However, there is a problem that Pb is an environmentally hazardous substances. Therefore, there is a demand for improving machinability without using S or Pb.

With the above background, regarding cutting techniques of steel for machine structural use, techniques regarding environment-responsive cutting oil are studied in, for example, Patent Document 1. When an oiliness improver is added to a lubricant made of lubricant-based oil, a dispersant and microparticle-form calcium carbonate, favorable lubrication property can be obtained without including a chlorine-based extreme-pressure additive.

In addition, regarding steel for machine structural use, steel having a new component composition or structure has been studied. For example, Patent Document 2 discloses that, when the amount of solute N, which is harmful to machinability, is suppressed to a low level by adjusting the added amount of high Al, other nitride-generating elements and N, and by carrying out an appropriate thermal treatment, and when an appropriate amount of solute Al which improves machinability through high-temperature embrittlement and of AlN which produces a high-temperature embrittlement effect and improves machinability through a cleavage crystal structure, is secured, steel for machine structural use having excellent machinability throughout a wide cutting rate range from low speed to high speed and having both high impact value and a high yield ratio is obtained.

As described above, regarding environment-responsive techniques in cutting processes, studies are being made on cutting oils and steel components. In the future, when further studying techniques considering environmental issue, it is necessary to study both cutting oils and steel components.

CITATION LIST

Patent Document

[Patent Document 1] Japanese Unexamined Patent Application, First Publication No. 2006-225491

[Patent Document 2] Japanese Unexamined Patent Application, First Publication No. 2008-13788

SUMMARY OF INVENTION

Technical Problem

However, there are the following problems in the techniques of the related art.

In Patent Document 1, while the same machinability, as in cutting oil in which the chlorine-based extreme-pressure agent of the related art is used, can be obtained, it is not possible to increase the lubrication property more than in the related art so as to improve the efficiency of a cutting process. Furthermore, only SCr 420 specified in JIS is described as steel.

In the technique disclosed in Patent Document 2, excellent machinability can be obtained throughout a wide cutting rate range as described above. Furthermore, when the added amount of Al is increased, steel for machine structural use can be obtained, in which less segregation occurs in a billet step than in Al-killed steel of the related art, more MnS having high uniform dispersibility is generated, and high impact characteristics are provided. In addition, in this steel for machine structural use, a higher yield ratio can be obtained than in the fine precipitation of AlN and solute Al. However, only steel components are specified, and no specific cutting method and cutting conditions are specified. Furthermore, there is no description regarding the water-insoluble cutting oil.

The present invention has been created in consideration of the above problems, and an object of the present invention is to provide a method of cutting steel for machine structural use in which the service life of a tool is long and the efficiency of a cutting process is excellent during cutting in which water-insoluble cutting oil is used.

Solution to Problem

In order to solve the above problems, the present inventors paid attention to lubricating mechanisms in the interface between a tool and a material to be cut, which is considered to have a large influence on the service life of the tool, and carried out intensive studies. As a result, the following findings were obtained.

(a) It was found using a scanning electron microscope-energy dispersion spectroscopy (SEM-EDS) or Auger electron spectroscopy (AES) that, in a case in which steel including a large amount of solute Al is cut using water-insoluble cutting oil including a large amount of dissolved oxygen, an oxide mainly including alumina is generated on a newly created surface of the steel and a tool. Since Al is an element having a larger bonding force with oxygen than Fe, in a case in which steel including a large amount of solute Al is cut using water-insoluble cutting oil having a large amount of dissolved oxygen, a chemical reaction is caused between solute Al and oxygen in the cutting oil, and an oxide mainly including alumina is generated.

(b) Since alumina is hard, the oxide mainly including alumina generated in the tool serves as a tool protective film, wear resistance is supplied to the tool, and the service life of the tool improves.

The present invention has been completed based on the above finding.

The present invention employs the following means in order to solve the above problems so as to achieve the relevant object.

(1) That is, in a method of cutting a steel for machine structural use according to an aspect of the present invention, steel for machine structural use, in which chemical components comprise, by mass %, C: 0.01% to 1.2%, Si: 0.005% to 3.0%, Mn: 0.05% to 3.0%, P: 0.001% to 0.2%, S: 0.001% to 0.35%, N: 0.002% to 0.035% and Al: 0.05% to 1.0%, in a case in which [Al%] and [N%] represent the mass % of Al and N in the steel respectively, the following formula 1 is satisfied, furthermore, one or more of Ca: 0.0001% to 0.02%, Ti: 0.0005% to 0.5%, Nb: 0.0005% to 0.5%, W: 0.0005% to 1.0%, V: 0.0005% to 1.0%, Ta: 0.0001% to 0.2%, Hf: 0.0001% to 0.2%, Mg: 0.0001% to 0.02%, Zr: 0.0001% to 0.02%, Rem: 0.0001% to 0.02%, Sb: 0.0001% to 0.015%, Sn: 0.0005% to 2.0%, Zn: 0.0005% to 0.5%, B: 0.0001% to 0.015%, Te: 0.0003% to 0.2%, Se: 0.0003% to 0.2%, Bi: 0.001% to 0.5%, Pb: 0.001% to 0.5%, Cr: 0.001% to 3.0%, Mo: 0.001% to 1.0%, Ni: 0.001% to 5.0%, Cu: 0.001% to 5.0%, Li: 0.00001% to 0.005%, Na: 0.00001% to 0.005%, K: 0.00001% to 0.005%, Ba: 0.00001% to 0.005% and Sr: 0.00001% to 0.005% is included, and a balance consisting of Fe and inevitable impurities, is used, and a cutting process is carried out on the steel for machine structural use using a water-insoluble cutting oil in which an amount of dissolved oxygen is 4 volume % to 16 volume %, $$[Al\%] - (27/14) \times [N\%] \geq 0.05\% \quad (1)$$

(2) In the aspect according to the above (1), during the cutting process, the a contact point between the steel for machine structural use and the tool may be covered with the water-insoluble cutting oil.

(3) In the aspect according to the above (1) or (2), the temperature of the water-insoluble cutting oil may be in a range of 5° C. to 80° C. in the cutting process.

(4) In the aspect according to the above (3), the supply amount of the water-insoluble cutting oil may be 0.5 L/minute to 100 L/minute in the cutting process.

(5) In the aspect according to the above (1) or (2), the supply amount of the water-insoluble cutting oil may be 0.5 L/minute to 100 L/minute in the cutting process.

Advantageous Effects of Invention

According to the aspects of the present invention, it is possible to provide a method of cutting steel for machine structural use in which an excellent service life of a tool can be obtained when cutting is carried out using water-insoluble cutting oil.

DESCRIPTION OF EMBODIMENTS

Hereinafter, a method of cutting steel for machine structural use according to an embodiment of the present invention will be described in detail.

First, water-insoluble cutting oil used in the embodiment will be described.

The water-insoluble cutting oil according to the embodiment includes 4 volume % to 16 volume % of dissolved oxygen therein at room temperature. The dissolved oxygen mentioned here refers to oxygen presenting in the oil in a dissolved state. When steel including a large amount of solute Al is cut using water-insoluble cutting oil including 4 volume % to 16 volume % of dissolved oxygen, it is possible to generate an oxide mainly including alumina on a tool. As a result, a tool protective film is formed, and the service life of the tool improves. In this case, the contact points between the steel for machine structural use and the tool are desirably covered with water-insoluble cutting oil including 4 volume % to 16 volume % of dissolved oxygen during cutting in order to cause a chemical reaction between the solute Al in the steel and the water-insoluble cutting oil. In addition, cutting desirably includes a process of covering the contact points between the steel for machine structural use and the tool with water-insoluble cutting oil. The amount of dissolved oxygen in the water-insoluble cutting oil can be measured using gas chromatography mass spectroscopy (GC-MS). The measurement can be carried out under, for example, the following conditions.

Determining equipment: HP5890 (Hewlett Packard), Detector: MSD, Column: 0V-1+Megaborecolumn+0V-1 (25 m)×2, Injecting temperature: 120° C., Oven temperature: 40° C., Carrier gas: He The volume % is an indication of a volume ratio of the amount of dissolved oxygen present in the water-insoluble cutting oil to the water-insoluble cutting oil, and, for example, the case of 4 volume % means that 4 mL-equivalent oxygen is dissolved in 100 mL of the water-insoluble cutting oil.

The amount of the dissolved oxygen needs to be 4 volume % or more in order to accelerate the generation of the tool protective film. Meanwhile, when the dissolved oxygen increases too much, specifically, to more than 16 volume %, deterioration is caused due to oxidation of the water-insoluble cutting oil, and the original lubrication property of the water-insoluble cutting oil is lost such that the service life of the tool decreases. Therefore, the amount of the dissolved oxygen is set to 4 volume % to 16 volume %, preferably set to 8 volume % to 15 volume %, and more preferably 10 volume % to 14 volume %.

The amount of the dissolved oxygen in the water-insoluble cutting oil can be increased by blowing air or oxygen into the oil in advance before the oil is used, and can also be decreased by carrying out deaeration while blowing nitrogen gas into the cutting oil.

There is a technique called a minimal quantity lubricants (MQL) process in which an extremely small amount of cutting oil and a large amount of air are made into a mist form, and blown onto the blade edge of a tool or the surface of a material to be cut while carrying out cutting, but the present invention is different from the MQL process. In the present invention, the water-insoluble cutting oil is used; however, in the MQL process, only an extremely small amount of cutting oil is used, which makes the present invention a completely different cutting method. While an extremely small amount of oil, approximately 2 mL/hour to 30 mL/hour, is made into a mist form and blown onto a processing point in the MQL process, in a case in which the water-insoluble cutting oil is used, a relatively large amount of the oil is supplied so as to cover the contact points of the steel for machine structural use and the tool.

In order to cover the contact points between the steel for machine structural use and the tool so as to supply sufficient oil and to accelerate the generation of the tool protective film, preferably 0.5 L/minute or more, more preferably 2 L/minute or more, and still more preferably 5 L/minute or more of oil is supplied. An amount more than the above results in saturation, and when too much oil is supplied, since the costs of oil waste treatment or environmental loads increase, the upper limit is preferably set to 100 L/minute.

In order to generate the tool protective film by causing a reaction, it is important to control the temperature of the water-insoluble cutting oil. When the temperature of the water-insoluble cutting oil is too low, since the necessary amount of heat for the reaction is not generated and the effect is reduced, the temperature of the water-insoluble cutting oil is preferably 5° C. or higher, and more preferably 15° C. or higher. On the other hand, when the temperature of the water-insoluble cutting oil is too high, not only does it deteriorate the oil, but there is another concern that the cutting properties may degrade due to deterioration of adherability caused by a decrease in the viscosity, and therefore the temperature of the water-insoluble cutting oil is preferably 80° C. or lower and more preferably 40° C. or lower. The temperature of the water-insoluble cutting oil can be adjusted using a heater for cutting oil or an oil cooler.

In addition, in order to increase the amount of heat generated to accelerate the reaction so as to generate the tool protective film, the cutting rate is preferably set to 10 m/minute or more.

Typical examples of the water-insoluble cutting oil include N1 type, N2 type, N3 type, N4 type and the like, which are classified using JIS K2241; however, in the present invention, the type of the water-insoluble cutting oil is not particularly limited as long as the amount of the dissolved oxygen satisfies the predetermined range.

The water-insoluble cutting oil can be supplied from a nozzle installed outside to a cutting unit. According to the present invention, the service life of a tool can be increased independently of the method of supplying the water-insoluble cutting oil.

The cutting method of the embodiment can be applied to any process of intermittent cutting and continuous cutting, such as a hobbing process, a turning process, a tapping process, a drilling process, a milling process, an end milling process and a broaching process.

Next, the reason for numerically limiting the contents of the respective components of the steel for machine structural use of the embodiment will be described. Meanwhile, in the following description, the mass % in the composition will be simply indicated using %.

C: 0.01% to 1.2%

C is an element having a large influence on the basic strength of steel. However, in a case in which the content of C is less than 0.01%, a sufficient strength cannot be obtained. On the other hand, when the content of C exceeds 1.2%, since hard carbides are much precipitated, machinability significantly degrades. Therefore, in order to obtain sufficient strength and machinability, the content of C is set to 0.01% to 1.2%, preferably set to 0.05% to 0.8%, and more preferably set to 0.10% to 0.70%.

Si: 0.005% to 3.0%

Si is added, generally, as a deoxidizing element, and also has effects of strengthening ferrite and supplying tempering softening resistance. However, in a case in which the content of Si is less than 0 005%, a sufficient deoxidizing effect cannot be obtained. On the other hand, when the content of Si exceeds 3.0%, toughness and ductility decrease, and, at the same time, machinability deteriorates because the hardness of the basis material increases. Therefore, the content of Si is set to 0.005% to 3.0%, preferably set to 0.01% to 2.5%, and more preferably set to 0.05% to 2.0%.

Mn: 0.05% to 3.0%

Mn is an element necessary to improve hardenability or secure strength after quenching by forming solid solutions in the matrix. In addition, Mn has an effect of improving machinability by bonding with S in steel so as to generate MnS-based sulfides. However, when the content of Mn is less than 0.05%, S in steel bonds with Fe so as to form FeS, and steel becomes brittle. On the other hand, when the content of Mn exceeds 3.0%, the hardness of the basis material increases, and workability or machinability degrades. Therefore, the content of Mn is set to 0.05% to 3.0%, preferably set to 0.2% to 2.5%, and more preferably set to 0.35% to 2.0%.

P: 0.001% to 0.2%

P has an effect of bettering machinability; however, in a case in which the content of P is less than 0.001%, the effect cannot be obtained. In addition, when the content of P exceeds 0.2%, toughness is significantly deteriorated, the hardness of the basis material increases in steel, and cold workability, hot workability and casting characteristics degrade. Therefore, the content of P is set to 0.001% to 0.2%, preferably set to 0.005% to 0.1%, and more preferably set to 0.01% to 0.05%.

S: 0.001% to 0.35%

S bonds with Mn so as to be present as a MnS-based sulfide in steel. MnS has an effect of improving machinability; however, in order to significantly obtain the effect, it is necessary to add 0.001% or more of S. On the other hand, when the content of S exceeds 0.35%, toughness and fatigue strength significantly degrade. Therefore, the content of S is set to 0.001% to 0.35%, preferably set to 0.005% to 0.15%, and more preferably set to 0.01% to 0.07%.

N: 0.002% to 0.035%

N bonds with Al, Ti, V, Nb or the like so as to generate nitrides or carbonitrides, and has an effect of suppressing coarsening of crystal grains. However, when the content of N is less than 0.002%, the effect is insufficient, on the other hand, when the content of N exceeds 0.035%, since the effect is saturated, and hot ductility significantly deteriorates, thereby it becomes extremely difficult to manufacture rolled steel. Therefore, the content of N is set to 0.002% to 0.035%, preferably set to 0.0025% to 0.02%, and more preferably set to 0.0030% to 0.016%.

Al: included in 0.05% to 1.0%, and satisfying [Al%]−(27/14)×[N%]≥0.05%

Al is the most important element in the embodiment. As a deoxidizing element, Al improves the internal qualities of steel. In addition, in a case in which water-insoluble cutting oil having an amount of dissolved oxygen of 4 volume % to 16 volume % is used in cutting, Al is an essential element in order to improve the service life of a tool by causing a chemical reaction between solute Al in steel and dissolved oxygen in the water-insoluble cutting oil so as to form a protective film of an oxide mainly including alumina on the tool. In order to sufficiently generate solute Al effective for improving the service life of a tool, the content of Al needs to be 0.05% or more. However, when the content of Al exceeds 1.0%, a large amount of a hard oxide having a high melting point is generated in steel, and causes abrasive wear as a soft inclusion, which increase the wear of a tool during cutting. Therefore, the content of Al is set to 0.05% to 1.0%, preferably set to 0.08% to 0.5%, and more preferably set to more than 0.1% to 0.26%.

When N is present in steel, AlN is generated. Since the atomic weight of N is 14, and the atomic weight of Al is 27, for example, when 0.01% of N is added, 27/14, that is, approximately twice solute Al (0.02%) is reduced, and, consequently, the effect of improving the service life of a tool degrades. In order to obtain a sufficient effect, since 0.05% or more of solute Al is required, in a case in which N is present in a certain amount, not 0%, it is necessary to add Al at an amount determined in consideration of the amount of N. That is, the amount of Al ([Al%]) and the amount of N ([N%]) need to satisfy [Al%]−(27/14)×[N%]≥0.05%, and preferably satisfy [Al%]−(27/14)×[N%]>0.1%. Regarding the upper limit, there is a case in which the content of Al becomes 1.0%, which is the upper limit, and the content of N becomes 0.002%, which is the lower limit.

In addition, in the steel for machine structural use of the embodiment, in order for improvement of machinability, formation of carbonitrides, an increase in strength through improvement of hardenability or improvement of tempering softening resistance, control of the form of sulfides using deoxidizing adjustment, and strengthening of ferrite, one or more of Ca: 0.0001% to 0.02%, Ti: 0.0005% to 0.5%, Nb: 0.0005% to 0.5%, W: 0.0005% to 1.0%, V: 0.0005% to 1.0%, Ta: 0.0001% to 0.2%, Hf: 0.0001% to 0.2%, Mg: 0.0001% to 0.02%, Zr: 0.0001% to 0.02%, Rem: 0.0001% to 0.02%, Sb: 0.0001% to 0.015%, Sn: 0.0005% to 2.0%, Zn: 0.0005% to 0.5%, B: 0.0001% to 0.015%, Te: 0.0003% to 0.2%, Se: 0.0003% to 0.2%, Bi: 0.001% to 0.5%, Pb: 0.001% to 0.5%, Cr: 0.001% to 3.0%, Mo: 0.001% to 1.0%, Ni: 0.001% to 5.0%, Cu: 0.001% to 5.0%, Li: 0.00001% to 0.005%, Na: 0.00001% to 0.005%, K: 0.00001% to 0.005%, Ba: 0.00001% to 0.005% and Sr: 0.00001% to 0.005% may be included in addition to the above respective components.

Ca: 0.0001% to 0.02%

Ca is a deoxidizing element, and suppresses the wear of a tool by decreasing the melting point of a hard oxide, such as alumina represented by $Al_2O_3$, so as to soften the oxide. However, in a case in which the content of Ca is less than 0.0001%, this machinability-improving effect cannot be obtained. In addition, when the content of Ca exceeds 0.02%, CaS is generated in steel, and conversely, machinability degrades. Therefore, in a case in which Ca is added, the content thereof is set to 0.0001% to 0.02%, preferably set to 0.0003% to 0.005%, and more preferably set to 0.0004% to 0.0020%.

Ti: 0.0005% to 0.5%

Ti is an element that forms a carbonitride, contributes to suppression of the growth or strengthening of austenite grains, and is used as a granulating element for preventing coarsening of grains in steel in which a high strength is required or a low strain is required. In addition, Ti is also a deoxidizing element, and has an effect of forming a soft oxide so as to improve machinability. However, in a case in which the content of Ti is less than 0 0005%, the effect is not observed. In addition, when the content of Ti exceeds 0.5%, a coarse carbonitride in a non-solid solution form, which causes hot cracking, is precipitated, and conversely, mechanical properties are impaired. Therefore, in a case in which Ti is added, the content thereof is set to 0.0005% to 0.5%, and preferably set to 0.01% to 0.3%.

Nb: 0.0005% to 0.5%

Nb is also an element that forms a carbonitride, contributes to strengthening of steel through secondary precipitation hardening, and suppression of the growth or strengthening of austenite grains, and is used as a granulating element for preventing coarsening of grains in steel in which a high strength is required or a low strain is required. However, in a case in which the content of Nb is less than 0 0005%, the effect of increasing the strength cannot be obtained. In addition, when more than 0.5% of Nb is added, a coarse carbonitride in a non-solid solution form, which causes hot cracking, is precipitated, and conversely, mechanical properties are impaired. Therefore, in a case in which Nb is added, the content thereof is set to 0.0005% to 0.5%, and preferably set to 0.005% to 0.2%.

W: 0.0005% to 1.0%

W is also an element that forms a carbonitride, and can strengthen steel through secondary precipitation hardening. However, in a case in which the content of W is less than 0.0005%, the effect of increasing strength cannot be obtained. In addition, when more than 1.0% of W is added, since a coarse carbonitride in a non-solid solution form, which causes hot cracking, is precipitated, conversely, mechanical properties are impaired. Therefore, in a case in which W is added, the content thereof is set to 0.0005% to 1.0%, and preferably set to 0.01% to 0.8%.

V: 0.0005% to 1.0%

V is also an element that forms a carbonitride and can strengthen steel through secondary precipitation hardening, and is appropriately added to steel whose strength needs to be increased. However, in a case in which the content of V is less than 0.0005%, the effect of increasing strength cannot be obtained. In addition, when more than 1.0% of V is added, since a coarse carbonitride in a non-solid solution form, which causes hot cracking, is precipitated, conversely, mechanical properties are impaired. Therefore, in a case in which V is added, the content thereof is set to 0.0005% to 1.0%, and preferably set to 0.01% to 0.8%.

Ta: 0.0001% to 0.2%

Similarly to Nb, Ta is also an element that contributes to strengthening of steel through secondary precipitation hardening, suppression of the growth or strengthening of austenite grains, and is used as a granulating element for preventing coarsening of grains in steel in which a high strength is required or a low strain is required. However, in a case in which the content of Ta is less than 0 0001%, the effect of increasing strength cannot be obtained. In addition, when more than 0.2% of Ta is added, a coarse precipitate in a non-solid solution form, which causes hot cracking, is generated such that, conversely, mechanical properties are impaired. Therefore, in a case in which Ta is added, the content thereof is set to 0.0001% to 0.2%, and preferably set to 0.001% to 0.1%.

Hf: 0.0001% to 0.2%

Similarly to Ti, Hf is also an element that contributes to suppression of the growth or strengthening of austenite grains, and is used as a granulating element for preventing coarsening of grains in steel in which a high strength is required or a low strain is required. However, in a case in which the content of Hf is less than 0.0001%, the effect of increasing strength cannot be obtained. In addition, when more than 0.2% of Hf is added, due to a coarse precipitate in a non-solid solution form, which causes hot cracking, conversely, mechanical properties are impaired. Therefore, in a case in which Hf is added, the content thereof is set to 0.0001% to 0.2%, and preferably set to 0.001% to 0.1%.

Mg: 0.0001% to 0.02%

Mg is a deoxidizing element, and generates an oxide in steel. In a case in which there is an assumption of deoxidation of Al, $Al_2O_3$, which is harmful to machinability, is modified into MgO or $Al_2O_3 \cdot MgO$, which is relatively soft and finely dispersed. In addition, an oxide thereof is liable to become a nucleus of MnS, and has an effect of finely dispersing MnS. However, when the content of Mg is less than 0.0001%, the above effect cannot be observed. In addition, Mg generates a complex sulfide with MnS so as to spheroidize MnS; however, when Mg is added excessively, more than 0.02%, the generation of sole MgS is accelerated so as to deteriorate machinability. Therefore, in a case in which Mg is added, the content thereof is set to 0.0001% to 0.02%, preferably set to 0.0003% to 0.0040%, and more preferably set to 0.0005% to 0.0030%.

Zr: 0.0001% to 0.02%

Zr is a deoxidizing element, and generates an oxide in steel. The oxide is considered to be $ZrO_2$, and this oxide becomes a precipitation nucleus of MnS, and thus has effects of increasing the precipitation sites of MnS and uniformly dispersing MnS. In addition, Zr has an action of forming a solid solution in MnS so as to generate a complex sulfide, lower the deformability, and suppress stretching of the MnS shape during rolling and hot forging. As such, Zr is an element effective for reducing the anisotropy. However, in a case in which the content of Zr is less than 0.0001%, a significant effect cannot be obtained regarding the above action. On the other hand, even when more than 0.02% of Zr is added, the yield becomes extremely poor so as to generate a large amount of hard compounds, such as $ZrO_2$ and ZrS, such that, conversely, mechanical properties, such as machinability, impact values and fatigue characteristics, degrade. Therefore, in a case in which Zr is added, the content thereof is set to 0.0001% to 0.02%, preferably set to 0.0003% to 0.01%, and more preferably set to 0.0005% to 0.005%.

Rem: 0.0001% to 0.02%

Rare earth metal (Rem) is a deoxidizing element, generates an oxide having a low melting point, and suppresses nozzle clogging during casting. In addition, since Rem forms a solid solution in MnS or bonds with MnS, lowers the deformability, and suppresses stretching of MnS during rolling and hot forging, Rem is an element effective for reducing the anisotropy. However, in a case in which the content of Rem is less than 0.0001% in total, the effect is not significant. In addition, when more than 0.02% of Rem is added, a large amount of a sulfide of Rem is generated, and machinability deteriorates. Therefore, in a case in which Rem is added, the content thereof is set to 0.0001% to 0.02%, preferably set to 0.0003% to 0.015%, and more preferably set to 0.0005% to 0.01%. REM mentioned here refers to one or more elements selected from Sc, Y, La, Ce, Pr, Nd, Pm, Sm, Eu, Gd, Tb, Dy, Ho, Er, Tm, Yb and Lu, which are rare earth elements.

Sb: 0.0001% to 0.015%

Sb makes ferrite brittle to an appropriate extent, and improves machinability. This effect cannot be observed when the content of Sb is less than 0.0001%. In addition, when the content of Sb exceeds 0.015%, the macro segregation of Sb becomes excessive, and the impact value significantly decreases. Therefore, the content of Sb is set to 0.0001% to 0.015%, preferably set to 0.0005% to 0.012%, and more preferably 0.001% to 0.01%.

Sn: 0.0005% to 2.0%

Sn has effects of making ferrite brittle so as to extend the service life of a tool and improving the surface roughness. However, in a case in which the content of Sn is less than 0.0005%, the effect cannot be observed. In addition, even when more than 2.0% of Sn is added, the effect is saturated. Therefore, in a case in which Sn is added, the content thereof is set to 0.0005% to 2.0%, preferably set to 0.001% to 1.0%, and more preferably set to 0.01% to 0.2%.

Zn: 0.0005% to 0.5%

Zn has effects of making ferrite brittle so as to extend the service life of a tool and improving the surface roughness. However, in a case in which the content of Zn is less than 0.0005%, the effect cannot be observed. In addition, even when more than 0.5% of Zn is added, the effect is saturated. Therefore, in a case in which Zn is added, the content thereof is set to 0.0005% to 0.5%, preferably set to 0.001% to 0.3%, and more preferably set to 0.01% to 0.1%.

B: 0.0001% to 0.015%

B has effects of grain boundary strengthening and hardenability when forming a solid solution, and has an effect of improving machinability when precipitated since B is precipitated as BN. These effects are not significant when the content of B is less than 0.0001%. On the other hand, even when more than 0.015% of B is added, since the effects are saturated, and BN is precipitated excessively, conversely, the mechanical properties of steel are impaired. Therefore, in a case in which B is added, the content thereof is set to 0.0001% to 0.015%, preferably set to 0.0005 to 0.01%, and more preferably set to 0.001% to 0.003%.

Te: 0.0003% to 0.2%

Te is a machinability-improving element. In addition, Te has an action of generating MnTe, and coexisting with MnS so that the deformability of MnS degrades and stretching of the MnS shape is suppressed. As such, Te is an effective element for reducing anisotropy. However, when the content of Te is less than 0.0003%, the effects cannot be observed. In addition, when the content of Te exceeds 0.2%, not only is the effect saturated, but hot ductility also degrades such that it is highly likely that defects are caused. Therefore, in a case in which Te is added, the content thereof is set to 0.0003% to 0.2%, preferably set to 0.0005 to 0.1%, and more preferably set to 0.001% to 0.01%.

Se: 0.0003% to 0.2%

Se is a machinability-improving element. In addition, Se has an action of generating MnSe, coexisting with MnS so that the deformability of MnS degrades and stretching of the MnS shape is suppressed. As such, Se is an effective element for reducing anisotropy. However, when the content of Se is less than 0.0003%, the effects cannot be observed. In addition, when the content of Se exceeds 0.2%, the effect is saturated. Therefore, in a case in which Se is added, the content thereof is set to 0.0003% to 0.2%, preferably set to 0.0005 to 0.1%, and more preferably set to 0.001% to 0.01%.

Bi: 0.001% to 0.5%

Bi is a machinability-improving element. However, when the content of Bi is less than 0.001%, the effect cannot be observed. In addition, even when more than 0.5% of Bi is added, the machinability-improving effect is saturated such that hot ductility degrades and defects are caused. Therefore, in a case in which Bi is added, the content thereof is set to 0.001% to 0.5%, preferably set to 0.01 to 0.3%, and more preferably set to 0.04% to 0.25%.

Pb: 0.001% to 0.5%

Pb is a machinability-improving element. However, when the content of Pb is less than 0 001%, the effect cannot be observed. In addition, even when more than 0.5% of Pb is added, the machinability-improving effect is saturated such that hot ductility degrades and defects are caused. Therefore, in a case in which Pb is added, the content thereof is set to 0.001% to 0.5%, preferably set to 0.01 to 0.3%, and more preferably set to 0.04% to 0.25%.

Cr: 0.001% to 3.0%

Cr is an element that improves hardenability and supplies tempering softening resistance, and is added to steel in which a high strength is required. However, when the content of Cr is less than 0.001%, these effects cannot be observed. In addition, when the content of Cr exceeds 3.0%, a Cr carbide is generated such that steel becomes brittle. Therefore, in a case in which Cr is added, the content thereof is set to 0.001% to 3.0%, preferably set to 0.01 to 2.3%, and more preferably set to 0.1% to 1.8%.

Mo: 0.001% to 1.0%

Mo is an element that supplies tempering softening resistance and improves hardenability, and is added to steel in which a high strength is required. However, when the content of Mo is less than 0.001%, these effects cannot be observed. In addition, even when more than 1.0% of Mo is added, these effects are saturated. Therefore, in a case in which Mo is added, the content thereof is set to 0.001% to 1.0%, preferably set to 0.01 to 0.8%, and more preferably set to 0.05% to 0.5%.

Ni: 0.001% to 5.0%

Ni strengthens ferrite, improves ductility, and is an effective element for hardenability improvement and corrosion resistance improvement. However, in a case in which the content of Ni is less than 0.001%, these effects cannot be observed. In addition, even when more than 5.0% of Ni is added, the effect is saturated in terms of mechanical properties and machinability degrades. Therefore, in a case in which Ni is added, the content thereof is set to 0.001% to 5.0%, preferably set to 0.1 to 4.0%, and more preferably set to 0.3% to 3.0%.

Cu: 0.001% to 5.0%

Cu strengthens ferrite and is also an effective element for hardenability improvement and corrosion resistance improvement. However, in a case in which the content of Cu is less than 0 001%, these effects cannot be observed. In addition, even when more than 5.0% of Cu is added, the effect is saturated in terms of mechanical properties. Therefore, in a case in which Cu is added, the content thereof is set to 0.001% to 5.0%, preferably set to 0.01 to 4.0%, and more preferably set to 0.1% to 3.0%. Meanwhile, Cu particularly degrades hot ductility, and causes defect during rolling, and therefore Cu is preferably added together with Ni.

Li: 0.00001% to 0.005%

Li becomes an oxide in steel, and forms an oxide with a low melting point, thereby suppressing wear of a tool. However, in a case in which the content of Li is less than 0.00001%, the effect cannot be observed. In addition, even when more than 0.005% of Li is added, the effect is saturated, and the erosion or the like of refractory materials is caused. Therefore, in a case in which Li is added, the content thereof is set to 0.00001% to 0.005%, and preferably set to 0.0001 to 0.0045%.

Na: 0.00001% to 0.005%

Similarly to Li, Na also becomes an oxide in steel, and forms an oxide with a low melting point, thereby suppressing wear of a tool. However, in a case in which the content of Na is less than 0.00001%, the effect cannot be observed. In addition, even when more than 0.005% of Na is added, not only is the effect saturated but the erosion or the like of refractory materials is also caused. Therefore, in a case in which Na is added, the content thereof is set to 0.00001% to 0.005%, and preferably set to 0.0001 to 0.0045%.

K: 0.00001% to 0.005%

Similarly to Li, K also becomes an oxide in steel, and forms an oxide with a low melting point, thereby suppressing wear of a tool. However, in a case in which the content of K is less than 0.00001%, the effect cannot be observed. In addition, even when more than 0.005% of Na is added, the effect is saturated and the erosion or the like of refractory materials is caused. Therefore, in a case in which K is added, the content thereof is set to 0.00001% to 0.005%, and preferably set to 0.0001 to 0.0045%.

Ba: 0.00001% to 0.005%

Similarly to Li, Ba also becomes an oxide in steel, and forms an oxide with a low melting point, thereby suppressing wear of a tool. However, in a case in which the content of Ba is less than 0.00001%, the effect cannot be observed. In addition, even when more than 0.005% of Ba is added, the effect is saturated and the erosion or the like of refractory materials is caused. Therefore, in a case in which Ba is added, the content thereof is set to 0.00001% to 0.005%, and preferably set to 0.0001 to 0.0045%.

Sr: 0.00001% to 0.005%

Similarly to Li, Sr also becomes an oxide in steel, and forms an oxide with a low melting point, thereby suppressing wear of a tool. However, in a case in which the content of Sr is less than 0.00001%, the effect cannot be observed. In addition, even when more than 0.005% of Sr is added, the effect is saturated and the erosion or the like of refractory materials is caused. Therefore, in a case in which Sr is added, the content thereof is set to 0.00001% to 0.005%, and preferably set to 0.0001 to 0.0045%.

As described above, according to the method of cutting steel for machine structural use according to the embodiment, when cutting is carried out using water-insoluble cutting oil in which the amount of dissolved oxygen is 4 volume % to 16 volume % at room temperature, solute Al in steel and dissolved oxygen in the water-insoluble cutting oil are chemically reacted, and therefore a protective film of an oxide mainly including alumina is formed on a tool, and an excellent service life of the tool can be obtained.

Meanwhile, in a case in which water-soluble cutting oil is used, cooling power is greater than in water-insoluble oil, and the temperature necessary for the reaction cannot be obtained, and therefore it is not possible to generate the protective film of an oxide, which impedes obtaining of the same effect.

EXAMPLE 1

Next, the effects of the present invention will be specifically described using invention examples and comparative examples.

In the present example, 150 kg of steels having the compositions shown in Tables 1-1 and 1-2 were melted in a vacuum melting furnace, extended forging into a cylindrical shape having a diameter of 13 mm is performed under a temperature condition of 1250° C. through hot forging, heated at 850° C. for one hour, and then a thermal treatment of air cooling was carried out. After that, the outer circumferences were turned into a diameter of 9 mm, the steels were drawn into a diameter of 8 mm, and, furthermore, cut into 300 mm per piece, thereby manufacturing test specimens for tool service life evaluation in a turning process.

TABLE 1-1

| | No. | Chemical components of steel (mass %) | | | | | | | | | Amount of dissolved oxygen in water-insoluble cutting oil (%) | Supply amount of water-insoluble cutting oil (L/minute) | Temperature of water-insoluble cutting oil (° C.) | VB_max (μm) |
|---|---|---|---|---|---|---|---|---|---|---|---|---|---|---|
| | | C | Si | Mn | P | S | Al | N | [Al%]-27/14 [N%] | other elements | | | | |
| Example | 1 | 0.45 | 0.25 | 0.76 | 0.014 | 0.048 | 0.113 | 0.0052 | 0.103 | | 11.8 | 5.0 | 20 | 47 |
| Example | 2 | 0.46 | 0.25 | 0.80 | 0.013 | 0.050 | 0.117 | 0.0054 | 0.107 | | 11.8 | 15.0 | 15 | 49 |
| Example | 3 | 0.40 | 0.40 | 0.73 | 0.015 | 0.067 | 0.100 | 0.0040 | 0.092 | B: 0.0015 | 14.5 | 20.0 | 20 | 53 |
| Example | 4 | 0.38 | 0.80 | 0.65 | 0.020 | 0.051 | 0.068 | 0.0048 | 0.059 | REM: 0.0053 | 11.7 | 25.0 | 20 | 49 |
| Example | 5 | 0.50 | 0.33 | 0.80 | 0.009 | 0.025 | 0.120 | 0.0048 | 0.111 | Ca: 0.0029, Sb: 0.0011 | 10.3 | 30.0 | 25 | 38 |
| Example | 6 | 0.55 | 0.09 | 0.85 | 0.011 | 0.030 | 0.110 | 0.0049 | 0.101 | Ca: 0.0013, Ni: 0.4, Ti: 0.025, B: 0.0017 | 8.8 | 35.0 | 20 | 50 |
| Example | 7 | 0.59 | 0.10 | 1.10 | 0.012 | 0.015 | 0.250 | 0.0067 | 0.237 | Ni: 0.3, Cr: 0.8 | 4.5 | 40.0 | 15 | 78 |
| Example | 8 | 0.38 | 0.05 | 0.35 | 0.008 | 0.008 | 0.480 | 0.0120 | 0.457 | Nb: 0.009, Mg: 0.002 | 12.6 | 45.0 | 15 | 43 |
| Example | 9 | 0.44 | 0.30 | 0.20 | 0.023 | 0.037 | 0.115 | 0.0075 | 0.101 | Ta: 0.0002 | 13.8 | 50.0 | 20 | 44 |
| Example | 10 | 0.47 | 0.22 | 0.55 | 0.033 | 0.044 | 0.980 | 0.0050 | 0.970 | W: 0.24 | 10.9 | 10.0 | 20 | 48 |
| Example | 11 | 0.44 | 0.25 | 0.80 | 0.013 | 0.055 | 0.150 | 0.0128 | 0.125 | Hf: 0.0002 | 9.7 | 5.0 | 20 | 58 |
| Example | 12 | 0.42 | 0.29 | 0.70 | 0.015 | 0.052 | 0.081 | 0.0056 | 0.070 | Ba: 0.00015 | 14.8 | 15.0 | 30 | 52 |
| Example | 13 | 0.70 | 0.90 | 0.82 | 0.014 | 0.078 | 0.120 | 0.0049 | 0.111 | Cr: 1.1, Mo: 0.23 | 6.4 | 15.0 | 40 | 73 |
| Example | 14 | 0.57 | 1.20 | 0.79 | 0.014 | 0.099 | 0.100 | 0.0052 | 0.090 | Ca: 0.0015 | 7.2 | 15.0 | 35 | 64 |
| Example | 15 | 1.10 | 1.97 | 1.80 | 0.015 | 0.120 | 0.115 | 0.0044 | 0.107 | Zr: 0.0046 | 4.1 | 15.0 | 20 | 85 |
| Example | 16 | 0.45 | 0.59 | 2.39 | 0.016 | 0.050 | 0.150 | 0.0158 | 0.120 | V: 0.4 | 5.6 | 15.0 | 20 | 75 |
| Example | 17 | 0.37 | 0.85 | 2.89 | 0.019 | 0.044 | 0.125 | 0.0021 | 0.121 | Mg: 0.0008 | 4.1 | 15.0 | 20 | 83 |
| Example | 18 | 0.46 | 2.30 | 0.75 | 0.022 | 0.043 | 0.114 | 0.0060 | 0.102 | V: 0.08 | 5.9 | 15.0 | 20 | 71 |
| Example | 19 | 0.45 | 2.70 | 0.10 | 0.015 | 0.050 | 0.123 | 0.0050 | 0.113 | Zr: 0.0025, Ca: 0.0011 | 8.0 | 15.0 | 20 | 54 |
| Example | 20 | 0.41 | 1.10 | 0.88 | 0.015 | 0.044 | 0.108 | 0.0037 | 0.101 | Ti: 0.07, Ca: 0.0012 | 10.2 | 15.0 | 20 | 38 |
| Example | 21 | 0.44 | 0.90 | 0.81 | 0.014 | 0.038 | 0.117 | 0.0045 | 0.108 | V: 0.21, Ca: 0.0005 | 10.4 | 15.0 | 20 | 36 |
| Example | 22 | 0.43 | 0.21 | 0.80 | 0.012 | 0.045 | 0.102 | 0.0044 | 0.094 | Na: 0.00010 | 12.7 | 15.0 | 20 | 42 |
| Example | 23 | 0.46 | 0.25 | 0.90 | 0.010 | 0.050 | 0.120 | 0.0048 | 0.111 | Li: 0.00011 | 11.9 | 100.0 | 40 | 35 |
| Example | 24 | 0.45 | 0.27 | 0.79 | 0.012 | 0.045 | 0.110 | 0.0040 | 0.102 | Sr: 0.0001 | 13.5 | 15.0 | 20 | 49 |
| Example | 25 | 0.44 | 0.30 | 0.59 | 0.011 | 0.044 | 0.110 | 0.0048 | 0.101 | Nb: 0.021, B: 0.0002 | 15.7 | 15.0 | 20 | 66 |
| Example | 26 | 0.45 | 0.41 | 0.80 | 0.014 | 0.088 | 0.105 | 0.0050 | 0.095 | Ca: 0.002, Hf: 0.027 | 14.3 | 15.0 | 20 | 55 |
| Example | 27 | 0.45 | 0.23 | 0.79 | 0.015 | 0.022 | 0.100 | 0.0025 | 0.095 | Ca: 0.0007, Ni: 1.3 | 11.9 | 15.0 | 20 | 39 |
| Example | 28 | 0.46 | 0.25 | 0.76 | 0.014 | 0.047 | 0.113 | 0.0052 | 0.103 | | 11.8 | 4.0 | 20 | 55 |
| Example | 29 | 0.45 | 0.24 | 0.76 | 0.014 | 0.048 | 0.116 | 0.0050 | 0.106 | | 11.8 | 2.0 | 20 | 60 |
| Example | 30 | 0.45 | 0.25 | 0.78 | 0.016 | 0.047 | 0.113 | 0.0052 | 0.103 | | 11.8 | 1.8 | 20 | 67 |
| Example | 31 | 0.44 | 0.24 | 0.76 | 0.015 | 0.048 | 0.116 | 0.0049 | 0.107 | | 11.8 | 0.5 | 20 | 71 |
| Example | 32 | 0.44 | 0.25 | 0.80 | 0.016 | 0.050 | 0.110 | 0.0048 | 0.101 | | 11.8 | 0.4 | 20 | 90 |
| Example | 33 | 0.45 | 0.23 | 0.77 | 0.014 | 0.051 | 0.115 | 0.0052 | 0.105 | | 11.8 | 0.1 | 20 | 96 |
| Example | 34 | 0.45 | 0.25 | 0.77 | 0.014 | 0.050 | 0.113 | 0.0052 | 0.103 | | 11.8 | 15.0 | 14 | 59 |
| Example | 35 | 0.45 | 0.26 | 0.76 | 0.014 | 0.048 | 0.111 | 0.0052 | 0.101 | | 11.8 | 15.0 | 10 | 62 |
| Example | 36 | 0.44 | 0.25 | 0.80 | 0.013 | 0.048 | 0.113 | 0.0048 | 0.104 | | 11.8 | 15.0 | 5 | 65 |
| Example | 37 | 0.46 | 0.25 | 0.76 | 0.012 | 0.048 | 0.118 | 0.0055 | 0.107 | | 11.8 | 15.0 | 3 | 95 |

TABLE 1-2

| | No. | Chemical components of steel (mass %) | | | | | | | | Amount of dissolved oxygen in water-insoluble cutting oil (%) | Supply amount of water-insoluble cutting oil (L/minute) | Temperature of water-insoluble cutting oil (° C.) | VB_max (μm) |
|---|---|---|---|---|---|---|---|---|---|---|---|---|---|
| | | C | Si | Mn | P | S | Al | N | [Al %]-27/14 [N %] other elements | | | | |
| Example | 38 | 0.44 | 0.57 | 0.85 | 0.015 | 0.039 | 0.120 | 0.0047 | 0.111 | 18.0 | 15.0 | 20 | 119 |
| Example | 39 | 0.51 | 0.49 | 0.57 | 0.016 | 0.043 | 0.128 | 0.0055 | 0.117 | 2.0 | 15.0 | 20 | 142 |
| Example | 40 | 0.45 | 0.60 | 0.75 | 0.014 | 0.036 | 0.120 | 0.0040 | 0.112 | 19.5 | 15.0 | 20 | 122 |
| Example | 41 | 0.47 | 0.52 | 0.88 | 0.010 | 0.051 | 0.139 | 0.0046 | 0.130 | 0.5 | 15.0 | 20 | 148 |
| Example | 42 | 0.42 | 0.53 | 0.19 | 0.014 | 0.017 | 0.141 | 0.0044 | 0.133 | 3.3 | 15.0 | 20 | 128 |
| Example | 43 | 0.40 | 0.60 | 0.77 | 0.016 | 0.020 | 0.131 | 0.0040 | 0.123 | 16.7 | 15.0 | 20 | 116 |
| Example | 44 | 1.33 | 0.60 | 0.87 | 0.012 | 0.052 | 0.122 | 0.0042 | 0.114 | 6.5 | 15.0 | 20 | 224 |
| Example | 45 | 0.44 | 3.15 | 1.43 | 0.015 | 0.033 | 0.115 | 0.0049 | 0.106 | 13.5 | 15.0 | 20 | 187 |
| Example | 46 | 0.45 | 0.25 | 3.10 | 0.016 | 0.027 | 0.127 | 0.0053 | 0.117 | 10.7 | 15.0 | 20 | 181 |
| Example | 47 | 0.45 | 0.20 | 1.10 | 0.014 | 0.037 | 0.046 | 0.0041 | 0.038 | 12.2 | 15.0 | 20 | 110 |
| Example | 48 | 0.54 | 0.26 | 0.78 | 0.014 | 0.045 | 0.039 | 0.0049 | 0.030 | 9.5 | 15.0 | 20 | 115 |
| Example | 49 | 0.47 | 0.23 | 0.80 | 0.013 | 0.092 | 1.390 | 0.0051 | 1.380 | 15.0 | 15.0 | 20 | 119 |
| Example | 50 | 0.68 | 0.21 | 0.81 | 0.019 | 0.051 | 0.190 | 0.0042 | 0.182 Ca:0.0235 | 8.0 | 15.0 | 20 | 118 |
| Example | 51 | 0.55 | 0.29 | 0.89 | 0.023 | 0.038 | 0.152 | 0.0142 | 0.125 Mg:0.0238 | 4.8 | 15.0 | 20 | 131 |

In addition, 2 tons of steels having the compositions shown in Tables 2-1 and 2-2 were melted in a vacuum melting furnace, bloomed into billets, further rolled into a diameter of 14 mm, drawn into a diameter of 12 mm, and cut into 2500 mm per piece, thereby manufacturing test specimens for tool service life evaluation in a tapping process.

TABLE 2-1

| | No. | Chemical components of steel (mass %) | | | | | | | | Amount of dissolved oxygen in water-insoluble cutting oil (%) | Supply amount of water-insoluble cutting oil (L/minute) | Temperature of water-insoluble cutting oil (° C.) | Number of times of the process |
|---|---|---|---|---|---|---|---|---|---|---|---|---|---|
| | | C | Si | Mn | P | S | Al | N | [Al %]-27/14 [N %] other elements | | | | |
| Example | 52 | 0.10 | 0.02 | 0.33 | 0.005 | 0.030 | 0.110 | 0.0048 | 0.101 | 11.3 | 15.0 | 40 | 447 |
| Example | 53 | 0.11 | 0.06 | 0.31 | 0.015 | 0.017 | 0.160 | 0.0052 | 0.150 Bi: 0.08 | 11.2 | 15.0 | 20 | 479 |
| Example | 54 | 0.19 | 0.20 | 1.11 | 0.018 | 0.010 | 0.109 | 0.0038 | 0.102 Ti: 0.018, B: 0.0018 | 15.7 | 15.0 | 20 | 343 |
| Example | 55 | 0.05 | 0.05 | 0.40 | 0.015 | 0.027 | 0.110 | 0.0039 | 0.102 Sb: 0.0046 | 10.3 | 15.0 | 20 | 473 |
| Example | 56 | 0.09 | 0.10 | 0.35 | 0.006 | 0.033 | 0.150 | 0.0050 | 0.140 Ti: 0.24 | 10.4 | 15.0 | 20 | 428 |
| Example | 57 | 0.13 | 0.25 | 0.50 | 0.005 | 0.005 | 0.060 | 0.0048 | 0.051 Hf: 0.08 | 14.0 | 15.0 | 20 | 401 |
| Example | 58 | 0.20 | 0.14 | 1.05 | 0.006 | 0.009 | 0.081 | 0.0048 | 0.072 Mo: 0.15 | 4.1 | 25.0 | 25 | 307 |
| Example | 59 | 0.12 | 0.08 | 1.50 | 0.009 | 0.020 | 0.108 | 0.0100 | 0.089 B: 0.0023 | 6.0 | 35.0 | 35 | 324 |
| Example | 60 | 0.22 | 0.05 | 0.80 | 0.011 | 0.050 | 0.120 | 0.0062 | 0.108 Sn: 0.013 | 7.3 | 45.0 | 40 | 349 |
| Example | 61 | 0.13 | 0.03 | 0.72 | 0.021 | 0.032 | 0.140 | 0.0084 | 0.124 Nb: 0.16, Ca: 0.0012 | 14.0 | 15.0 | 15 | 483 |
| Example | 62 | 0.11 | 0.04 | 0.60 | 0.032 | 0.100 | 0.200 | 0.0052 | 0.190 Zn: 0.017 | 11.9 | 15.0 | 20 | 472 |
| Example | 63 | 0.10 | 0.10 | 0.93 | 0.015 | 0.015 | 0.130 | 0.0090 | 0.113 Te: 0.003 | 6.2 | 15.0 | 20 | 342 |
| Example | 64 | 0.12 | 0.15 | 0.35 | 0.014 | 0.014 | 0.109 | 0.0149 | 0.080 Cr: 1.15 | 11.5 | 15.0 | 20 | 428 |
| Example | 65 | 0.13 | 0.30 | 0.36 | 0.011 | 0.024 | 0.123 | 0.0110 | 0.102 Se: 0.002 | 7.0 | 70.0 | 20 | 352 |
| Example | 66 | 0.16 | 0.21 | 0.26 | 0.013 | 0.019 | 0.090 | 0.0032 | 0.084 Pb: 0.13 | 12.4 | 15.0 | 20 | 496 |
| Example | 67 | 0.11 | 0.12 | 0.20 | 0.005 | 0.009 | 0.340 | 0.0021 | 0.336 Cr: 0.4, B: 0.002 | 9.7 | 15.0 | 20 | 380 |
| Example | 68 | 0.14 | 0.15 | 0.07 | 0.010 | 0.023 | 0.450 | 0.0120 | 0.427 Ni: 0.53 | 8.1 | 15.0 | 20 | 359 |
| Example | 69 | 0.33 | 0.05 | 0.33 | 0.008 | 0.043 | 0.870 | 0.0045 | 0.861 Cu: 0.12 | 5.9 | 15.0 | 20 | 313 |
| Example | 70 | 0.21 | 0.09 | 0.35 | 0.015 | 0.022 | 0.114 | 0.0041 | 0.106 Nb: 0.02 | 14.6 | 15.0 | 20 | 378 |
| Example | 71 | 0.10 | 0.11 | 0.36 | 0.010 | 0.033 | 0.103 | 0.0047 | 0.094 Ni: 0.47, Cu: 0.24 | 10.2 | 15.0 | 20 | 416 |
| Example | 72 | 0.18 | 0.22 | 0.39 | 0.001 | 0.031 | 0.100 | 0.0051 | 0.090 K: 0.00012 | 12.9 | 15.0 | 20 | 446 |
| Example | 73 | 0.13 | 0.18 | 0.37 | 0.010 | 0.021 | 0.125 | 0.0051 | 0.115 Ta: 0.06 | 11.9 | 90.0 | 20 | 449 |
| Example | 74 | 0.13 | 0.13 | 1.06 | 0.050 | 0.012 | 0.110 | 0.0043 | 0.102 V: 0.2, Ca: 0.0003 | 5.0 | 15.0 | 20 | 351 |
| Example | 75 | 0.12 | 0.10 | 1.00 | 0.012 | 0.017 | 0.130 | 0.0042 | 0.122 Ca: 0.0018, Cr: 0.7 | 15.3 | 15.0 | 20 | 344 |
| Example | 76 | 0.11 | 0.12 | 0.70 | 0.005 | 0.020 | 0.152 | 0.0047 | 0.143 Ca: 0.0006, B: 0.0015 | 14.3 | 15.0 | 20 | 393 |
| Example | 77 | 0.10 | 0.09 | 0.30 | 0.015 | 0.015 | 0.163 | 0.0041 | 0.155 Ti: 0.1, Nb: 0.03 | 8.8 | 15.0 | 20 | 373 |
| Example | 78 | 0.10 | 0.02 | 0.33 | 0.005 | 0.029 | 0.111 | 0.0048 | 0.102 | 11.3 | 4.0 | 20 | 390 |
| Example | 79 | 0.11 | 0.03 | 0.32 | 0.005 | 0.031 | 0.114 | 0.0048 | 0.105 | 11.3 | 2.0 | 20 | 387 |
| Example | 80 | 0.11 | 0.02 | 0.33 | 0.006 | 0.030 | 0.108 | 0.0048 | 0.101 | 11.3 | 0.7 | 20 | 355 |
| Example | 81 | 0.11 | 0.02 | 0.31 | 0.006 | 0.029 | 0.115 | 0.0049 | 0.106 | 11.3 | 0.30 | 20 | 309 |
| Example | 82 | 0.10 | 0.03 | 0.33 | 0.005 | 0.032 | 0.109 | 0.0042 | 0.101 | 11.3 | 15.0 | 15 | 450 |
| Example | 83 | 0.10 | 0.02 | 0.34 | 0.004 | 0.030 | 0.110 | 0.0048 | 0.101 | 11.3 | 15.0 | 45 | 380 |
| Example | 84 | 0.10 | 0.02 | 0.35 | 0.005 | 0.029 | 0.115 | 0.0050 | 0.105 | 11.3 | 15.0 | 60 | 370 |
| Example | 85 | 0.10 | 0.02 | 0.33 | 0.005 | 0.029 | 0.110 | 0.0044 | 0.102 | 11.3 | 15.0 | 80 | 365 |

TABLE 2-1-continued

| | No. | C | Si | Mn | P | S | Al | N | [Al %]-27/14 [N %] | other elements | Amount of dissolved oxygen in water-insoluble cutting oil (%) | Supply amount of water-insoluble cutting oil (L/minute) | Temperature of water-insoluble cutting oil (°C.) | Number of times of the process |
|---|---|---|---|---|---|---|---|---|---|---|---|---|---|---|
| Example | 86 | 0.12 | 0.02 | 0.32 | 0.006 | 0.031 | 0.110 | 0.0046 | 0.101 | | 11.3 | 15.0 | 85 | 310 |
| Example | 87 | 0.10 | 0.03 | 0.35 | 0.005 | 0.032 | 0.113 | 0.0048 | 0.104 | | 11.3 | 15.0 | 100 | 301 |

TABLE 2-2

| | No. | C | Si | Mn | P | S | Al | N | [Al %]-27/14 [N %] | other elements | Amount of dissolved oxygen in water-insoluble cutting oil (%) | Supply amount of water-insoluble cutting oil (L/minute) | Temperature of water-insoluble cutting oil (°C.) | Number of times of the process |
|---|---|---|---|---|---|---|---|---|---|---|---|---|---|---|
| Example | 88 | 0.12 | 0.11 | 0.40 | 0.013 | 0.015 | 0.132 | 0.0047 | 0.123 | | <u>18.0</u> | 15.0 | 20 | 178 |
| Example | 89 | 0.11 | 0.25 | 0.35 | 0.010 | 0.005 | 0.123 | 0.0036 | 0.116 | | <u>2.0</u> | 15.0 | 20 | 136 |
| Example | 90 | 0.13 | 0.13 | 0.80 | 0.005 | 0.032 | 0.251 | 0.0051 | 0.241 | | <u>19.5</u> | 15.0 | 20 | 165 |
| Example | 91 | 0.15 | 0.20 | 0.75 | 0.015 | 0.014 | 0.120 | 0.0045 | 0.111 | | <u>0.5</u> | 15.0 | 20 | 130 |
| Example | 92 | 0.09 | 0.20 | 0.94 | 0.015 | 0.020 | 0.130 | 0.0055 | 0.119 | | <u>3.3</u> | 15.0 | 20 | 151 |
| Example | 93 | 0.12 | 0.25 | 0.34 | 0.010 | 0.032 | 0.110 | 0.0047 | 0.101 | | <u>16.8</u> | 15.0 | 20 | 186 |
| Example | 94 | 0.08 | 0.05 | 1.08 | 0.012 | 0.025 | <u>0.032</u> | 0.0032 | <u>0.026</u> | | 6.5 | 15.0 | 20 | 157 |
| Example | 95 | 0.30 | 0.03 | 0.50 | 0.030 | 0.101 | <u>0.070</u> | 0.0132 | <u>0.045</u> | | 7.2 | 15.0 | 20 | 150 |
| Example | 96 | 0.10 | 0.16 | 0.34 | 0.014 | 0.050 | <u>1.140</u> | 0.0045 | 1.131 | | 10.7 | 15.0 | 20 | 178 |
| Example | 97 | 0.12 | 0.15 | 0.20 | 0.006 | 0.034 | 0.132 | 0.0021 | 0.128 | <u>Zr:0.023</u> | 12.1 | 15.0 | 20 | 173 |
| Example | 98 | 0.15 | 0.17 | 0.09 | 0.010 | 0.038 | 0.148 | 0.0048 | 0.139 | <u>Rem:0.0259</u> | 9.5 | 15.0 | 20 | 145 |
| Example | 99 | 0.10 | 0.12 | 1.45 | 0.003 | 0.015 | 0.102 | 0.0084 | 0.086 | <u>Ni:5.5</u> | 15.0 | 15.0 | 20 | 157 |

The tool service life was evaluated using a turning process for the steels shown in Tables 1-1 and 1-2 and using tapping for the steels shown in Tables 2-1 and 2-2. In all tests, a small-scale high-speed lathe was used, and the tests were carried out while supplying water-insoluble cutting oil obtained by adjusting the amount of dissolved oxygen and the temperature with respect to water-insoluble cutting oil corresponding to N3-type No. 8 classified by JIS K2241 (product name: UNICUT TERAMI DM15, manufactured by ENEOS) from a nozzle so as to cover the portion at which a tool and a subject to be cut come into contact. Meanwhile, the amount of dissolved oxygen was obtained at room temperature. In addition, among the temperatures of the water-insoluble cutting oils described in Tables 1-1, 1-2, 2-1 and 2-2, 20° C. refers to a temperature obtained at room temperature with no particular adjustment of the temperature. The amount of the water-insoluble cutting oil was adjusted using a squeezer embedded in the nozzle. In the turning process, the test was carried out by processing the outer circumference of the drawn steel. In tapping, first, a pilot hole having a diameter of 5.2 mm and a depth of 16 mm was opened using a TiN-coated HSS (High-SpeedSteal) drill at the central portion on the cross-section of the drawn steel, and then a screw cutting process with a depth of 10 mm was carried out at a tap of M6. Next, the screw cutting-processed portion was cut off using a cutting-off tool, and, again, the pilot hole process using the drill and the screw cutting process at the tap were repeated.

Since the present test was for the service life evaluation of a tap, the drill for the pilot hole process and the cutting-off tool for cutting-off were exchanged with new products every 100 times of the process. The cutting conditions and the used tools were shown in Tables 3 and 4 respectively. The tests were carried out with the diversely changed amounts of dissolved oxygen in the water-insoluble cutting oil as shown in Tables 1-1, 1-2, 2-1, and 2-2. The amount of dissolved oxygen in the water-insoluble cutting oil was measured using gas chromatography mass spectroscopy (GC-MS). In the turning process, the maximum wear amount VB max of the tool flank face was measured after 16 minutes of cutting, and the tool wear amount of 100 μm or less was used as the pass standard. In the tapping, the tool service life was evaluated using the number of times of use of the tap until breakage, and the numbers of times of process of 300 times or more were evaluated as pass. Tables 1-1, 1-2, 2-1 and 2-2 also showed the results of the tests of tool service life evaluation. Meanwhile, values which fail to satisfy the configuration of the present invention are underlined.

TABLE 3

| Cutting conditions | Speed | 80 m/minute |
|---|---|---|
| | Feeding | 0.05 mm/rev |
| | Cutting-in | 1 mm |
| | Cutting time | 16 minutes |
| Tool | Material | Cermet |
| | Shape | TNGG160404R |

TABLE 4

| Cutting conditions | Speed | 12 m/minute |
|---|---|---|
| | Pilot hole | ϕ5.2 × 16 mm (blind hole) |
| | Tapping length | 10 mm |

TABLE 4-continued

| Tool | Material Size | TiCN-coated high-speed steel M6 × 1 OH2 2.5P |
|------|---------------|---------------------------------------------|

As shown in Tables 1-1 and 2-1, Examples 1 to 37 and 52 to 87 are within the range of the present invention, the tools are slightly worn or the numbers of times until breakage increases, and excellent tool lifetimes can be obtained. Furthermore, in Examples 3, 5, 6, 12, 14, 19 to 27, 53 to 55, 59 to 63, 65 to 67, 72, and 74 to 76, which include elements that improve machinability, machinability is superior within approximately the same range of the amount of dissolved oxygen. In addition, Examples 4, 7 to 11, 13, 15 to 18, 56 to 58, 64, 68 to 71, 73, and 77, to which elements for an increase in the strength, control of the form of sulfides, or the like are added, sufficient machinability can be obtained. In addition, it is found from Examples 1, 28 to 33, 52, and 78 to 81 that setting the supply amount to 0.5 L/minute or more is effective to further increase machinability. In addition, it is found from Examples 2, 34 to 37, 52, and 82 to 87 that setting the temperature in a range of 5° C. to 80° C. is effective to further increase machinability.

Meanwhile, Examples 38 to 51 and 88 to 99 are comparative examples which have chemical components underlined in Tables 1-2 and 2-2 or having an amount of dissolved oxygen outside the range of the present invention. In Examples 39, 41, 42, 89, 91, and 92, since the amounts of dissolved oxygen in the water-insoluble cutting oils were less than 4 volume %, the effect of forming a protective film of an oxide mainly including alumina on the tool so as to improve the service life of the tool could not be obtained, and machinability degraded. In Examples 38, 40, 43, 88, 90, and 93, since the amounts of dissolved oxygen in the water-insoluble cutting oils were more than 16 volume %, deterioration of the water-insoluble cutting oils due to oxidation was caused, and the original lubrication property of the water-insoluble cutting oil was lost, thereby degrading machinability. In Example 44, since the content of C was excessive, a hard carbide was precipitated to a large extent, and machinability degraded. In Example 45, since the content of Si was excessive, the hardness of the basis material increased, and machinability degraded. In Example 46, since the content of Mn was excessive, the hardness of the basis material increased, and machinability degraded. In Examples 47, 48 and 94, since the contents of Al were insufficient, the effect of forming a protective film of an oxide mainly including alumina on the tool so as to improve the service life of the tool could not be obtained, and machinability degraded.

In Example 95, although the content of Al was 0.05% or more, and [Al%]−(27/14)×[N%]≥0.05% was not satisfied, therefore, the effect of forming a protective film of an oxide mainly including alumina on the tool so as to improve the service life of the tool could not be obtained, and machinability degraded. In Examples 49 and 96, since the contents of Al were excessive, a large amount of a hard oxide having a high melting point was generated in the steels, machinability degraded. In Example 50, since the content of Ca was excessive, CaS was generated in the steel, and machinability degraded. In Example 51, since the content of Mg was excessive, generation of MgS was accelerated such that machinability degraded. In Example 97, since the content of Zr was excessive, a large amount of hard compounds, such as $ZrO_2$ and ZrS, were generated such that machinability degraded. In Example 98, since the content of Rem was excessive, a large amount of a sulfide of Rem was generated such that machin-ability degraded. In Example 99, the addition amount of Ni was excessive, machinability degraded.

Figure 1:
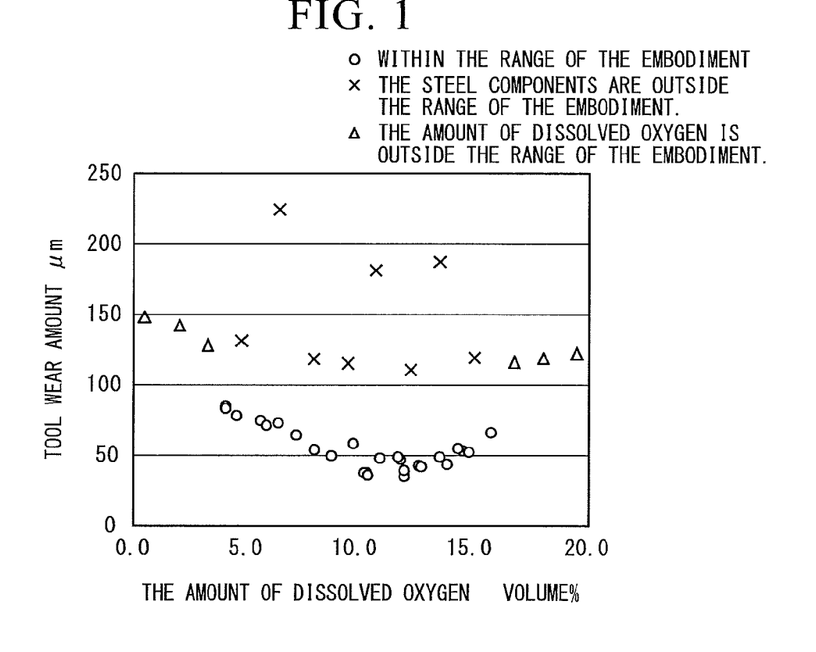
FIG. 1 is a view showing the relationship between the amount of dissolved oxygen in water-insoluble cutting oil and the wear amount of a tool during a turning process.
Figure 2:
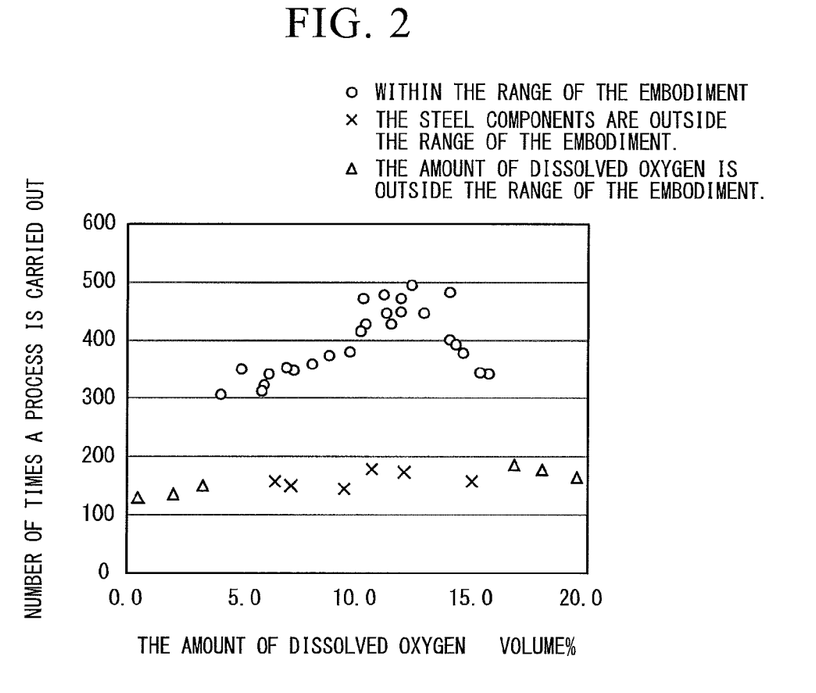
FIG. 2 is a view showing the relationship between the amount of dissolved oxygen in water-insoluble cutting oil and the number of times a process is carried out until breakage of the tool during tapping.

The results of Examples 1, 3 to 27, 38 to 51, 52 to 77 and 88 to 99 were shown in FIGS. 1 and 2. In FIG. 1, the transverse axis indicates the volume % of the amount of dissolved oxygen in the water-insoluble cutting oil, and the vertical axis indicates the tool wear amount during the turning process. In FIG. 2, the transverse axis indicates the volume % of the amount of dissolved oxygen in the water-insoluble cutting oil, and the vertical axis indicates the number of times of the process until breakage of the tap during the tapping process. Within the range of the present invention, the tool wear amount is small in FIG. 1, and the number of times of the process until breakage becomes large in FIG. 2 so that excellent machinability can be obtained. On the other hand, in a case in which any of the steel components and the amount of dissolved oxygen in the water-insoluble cutting oil is outside the range of the present invention, machinability is inferior to that of the present invention.

Thus far, the examples have been described. The examples are simply examples, and the purport of the present invention is not limited to the above description, and can be widely interpreted based on the claims.

INDUSTRIAL APPLICABILITY

As described above, according to the present invention, in a cutting process using water-insoluble cutting oil, it is possible to improve the service life of a tool, and the present invention is particularly effective in processes in which water-insoluble cutting oil is often used, such as gun drilling, gear cutting, broaching and tapping. Therefore, the present invention has a large industrial applicability in industries of manufacturing mechanical components, such as gears, shafts and nuts.

The invention claimed is:

1. A method of cutting a steel for machine structural use, wherein the steel comprises, by mass %,
   C: 0.01% to 1.2%,
   Si: 0.005% to 3.0%,
   Mn: 0.05% to 3.0%,
   P: 0.001% to 0.2%,
   S: 0.001% to 0.35%,
   N: 0.002% to 0.035%, and
   Al: 0.05% to 1.0%,
   wherein, [Al%] and [N%] representing mass % of Al and N in the steel respectively, the following formula 1 is satisfied, $$[Al\%]-(27/14)\times[N\%]\geq 0.05\% \quad (1)$$

and
   a balance consisting of Fe and inevitable impurities,
   the method comprising:
   a cutting process is carried out on the steel using a water-insoluble cutting oil in which an amount of dissolved oxygen is 4 volume % to 16 volume % so as to generate an oxide mainly including alumina on a tool, and
   wherein a supply amount of the water-insoluble cutting oil is 0.5 L/minute to 100 L/minute in the cutting process.

2. The method of cutting the steel for machine structural use according to claim 1, wherein the steel further comprises one or more of
   Ca: 0.0001% to 0.02%,
   Ti: 0.0005% to 0.5%,
   Nb: 0.0005% to 0.5%,
   W: 0.0005% to 1.0%,
   V: 0.0005% to 1.0%, Ta: 0.0001% to 0.2%,
Hf: 0.0001% to 0.2%,
Mg: 0.0001% to 0.02%,
Zr: 0.0001% to 0.02%,
Rem: 0.0001% to 0.02%,
Sb: 0.0001% to 0.015%,
Sn: 0.0005% to 2.0%,
Zn: 0.0005% to 0.5%,
B: 0.0001% to 0.015%,
Te: 0.0003% to 0.2%,
Se: 0.0003% to 0.2%,
Bi: 0.001% to 0.5%,
Pb: 0.001% to 0.5%,
Cr: 0.001% to 3.0%,
Mo: 0.001% to 1.0%,
Ni: 0.001% to 5.0%,
Cu: 0.001% to 5.0%,
Li: 0.00001% to 0.005%,
Na: 0.00001% to 0.005%,
K: 0.00001% to 0.005%,
Ba: 0.00001% to 0.005%, or
Sr: 0.00001% to 0.005%.

3. The method of cutting the steel for machine structural use according to claim 1 or 2,
wherein a temperature of the water-insoluble cutting oil is in a range of 5° C. to 80° C. in the cutting process.

4. The method of cutting the steel for machine structural use according to claim 1 or 2,
wherein, during the cutting process, a contact point between the steel and the tool is covered with the water-insoluble cutting oil.

5. The method of cutting the steel for machine structural use according to claim 4, wherein a temperature of the water-insoluble cutting oil is in a range of 5° C. to 80° C. in the cutting process.

* * * * *